United States Patent [19]

Yamada

[11] 4,449,795

[45] May 22, 1984

[54] STEREOSCOPE WITH TONGUE AND GROOVES

[75] Inventor: Toshikatsu Yamada, Tokyo, Japan

[73] Assignee: k. k. Yamada Kogaku Seisakusho, Tokyo, Japan

[21] Appl. No.: 335,929

[22] Filed: Dec. 30, 1981

[30] Foreign Application Priority Data

Aug. 21, 1981 [JP] Japan .............. 56-124536[U]
Aug. 21, 1981 [JP] Japan .............. 56-124535[U]

[51] Int. Cl.³ .................. G02B 21/22; G02B 27/02
[52] U.S. Cl. .................. 350/516; 350/571; 350/145
[58] Field of Search ............ 350/516, 515, 514, 145, 350/146, 139, 517, 571

[56] References Cited

U.S. PATENT DOCUMENTS

| 262,846 | 8/1882 | Stevens | 350/139 |
| 1,470,670 | 10/1923 | Heimstadt | 350/516 |

FOREIGN PATENT DOCUMENTS

| 80337 | 4/1895 | Fed. Rep. of Germany | 350/139 |
| 332025 | 1/1921 | Fed. Rep. of Germany | 350/516 |
| 2021864 | 10/1971 | Fed. Rep. of Germany | 350/516 |
| 14088 | of 1898 | United Kingdom | 350/145 |

OTHER PUBLICATIONS

Bausch and Lomb Catalogue D-15, 1948, pp. 3 and 17.

Primary Examiner—Jon W. Henry

[57] ABSTRACT

A stereoscope comprises a pair of eye pieces and an objective lens disposed on a frame. The center of the objective lens is fitted to be deviated from the optical axis of the eye piece. One or both eye pieces are slidable to the frame. The stereoscope can be replaced by a microscope body constituted by an eye piece and an objective lens, through the intermediary of a grip extended from the frame.

3 Claims, 3 Drawing Figures

STEREOSCOPE WITH TONGUE AND GROOVES

BACKGROUND OF THE INVENTION

The present invention relates to an optical instrument for observing an object with both eyes and in particular to a stereoscope in which at least one or both eye pieces are slidable to a frame.

In the prior art, a binocular magnifying lens constituted either by a combination of two convex lenses or adapted to utilize a prism action of a lens by deflecting an optical axis from the center of the lens has been known.

However, the above structure could not provide a binocular magnifying lens with a high magnification nor for the same reason as the fact that when a person with normal vision uses spectacles for the aged, it is tiring; its use could not be endured for long periods of time.

Further, in a magnifying lens which utilizes a prism action, there is the defect that a long distance between the eyes and the lens (the eye point) is required.

Moreover, in a conventional stereoscope, when it was used in a dissection, after the dissected body resting on the dissecting table was observed with a stereoscope, and because of further need to observe in detail by magnification with a microscope; it was necessary to transfer the dissected body to a sample holder of a microscope.

It is the general object of the invention to provide a stereoscope which can eliminate the above defects of the conventional stereoscope. It is the principal object of the invention to provide a stereoscope in which an optical axis meets an object and high magnification can be obtained by combining the eye pieces with an objective lens, with the center of the objective lens deviating from the optical axis of the eye piece by which a prism action is utilized, thereby reducing eye strain when used for long periods of time.

It is a further object of the invention to provide a stereoscope in which a frame of the stereoscope and a microscope body are replaceably disposed on one base stand whereby observation on one sample holder can be made with the stereoscope for a wide visual range and increased magnification can be provided with the microscope.

According to the invention the stereoscope is composed of a pair of eye pieces and an objective lens, one or both of which are slidable to the frame, fitted into the frame so that the optical axis of the eye pieces deviate from the center of the objective lens.

Other objects and features of the invention will be apparent from reading the following description in connection with the accompanying drawings, in which, FIG. 1 is a partial cross sectional view showing a stereoscope according to the invention;

DETAILED DESCRIPTION OF A PREFERRED EMBODIMENT

Figure 1:
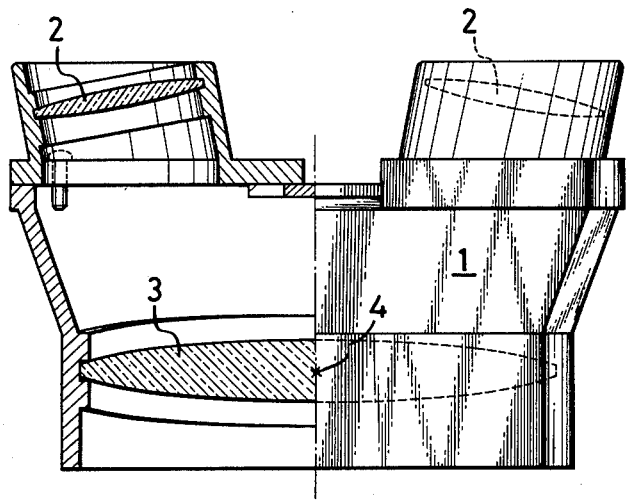
Figure 2:
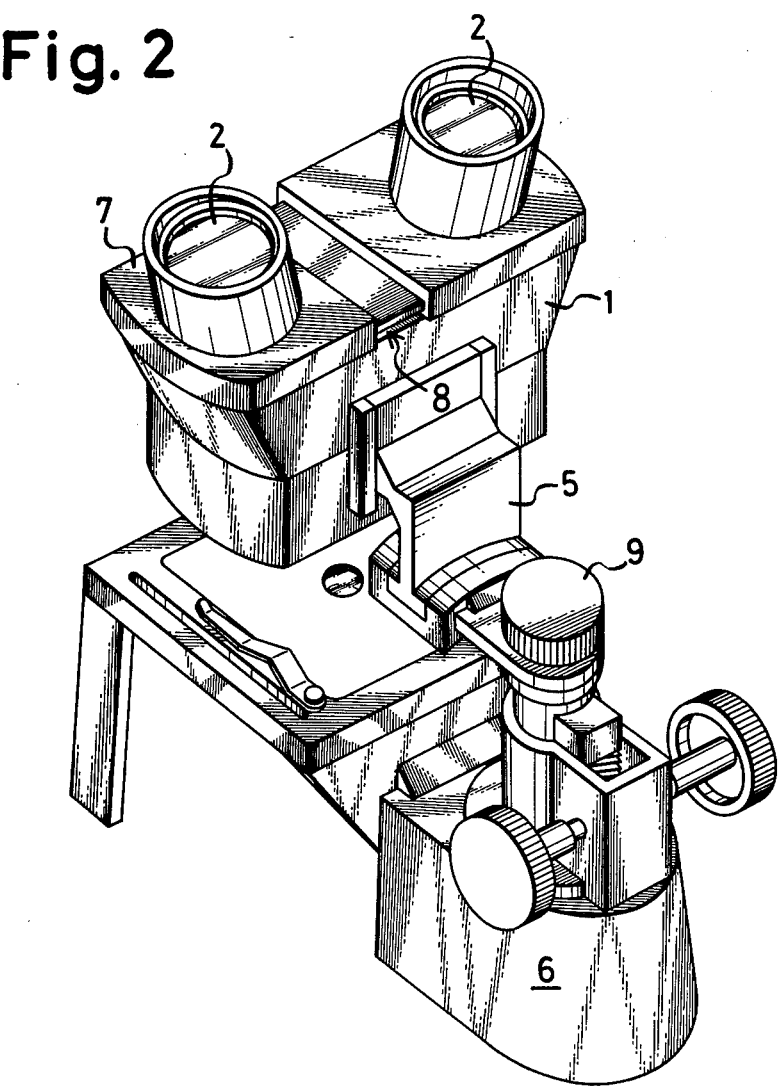
FIG. 2 is a perspective view showing the stereoscope of the invention.
Figure 3:
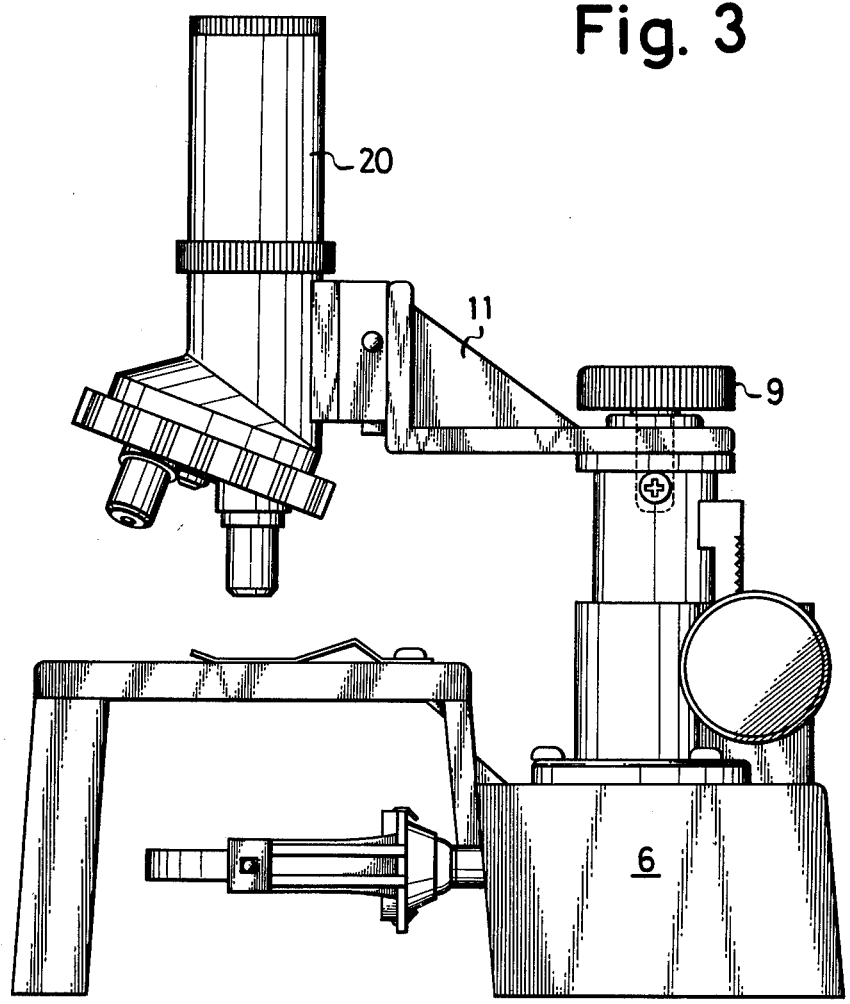
FIG. 3 is a perspective view showing a microscope.

Referring to now FIGS. 1 to 3, there is shown a frame 1 of a stereoscope having a generally elliptical shape in cross section. Frame 1, further has a shape drawn in at its central portion, and in which an objective lens 3 is fitted into its lower portion.

At the upper end of the frame 1, flat plates 7 are disposed as a fitting portion about the circular cylindrical body in cross section into which a pair of eye pieces are fitted. The flat plates 7 are adapted to slide by means of a slot 8 and a lip portion to adjust the spacing of eye pieces 2 to accommodate the interocular distance of the user.

The eye pieces 2 are fitted into the cylindrical body in a slanted direction for easy vision.

However, in the invention, it is to be noted that the shape of the frame is not important as long as it allows a pair of eye pieces and an objective lens to be fitted.

Since the stereoscope of the invention is adapted to utilize a prism action of the objective lens, the center of the objective lens is not used. By excluding the center of one convex lens, two portions, instead of one objective lens, can be formed and set in the body.

In the stereoscope of the invention, center 4 of the objective lens 3 is intended to be deviated from the optical axis of the eye pieces 2. Such is required in that the stereoscope utilizes a prism action of the objective lens 3. Accordingly, it is different from a microscope in its structure.

The structure of the invention is intended, unlike a microscope with a narrow visual range which can not be used for example in dissection, in repairing watches or the like, when in use to give a wide visual range and to obtain high magnification.

Further, the stereoscope of the invention has a structure in which one or both eye pieces are slidable to the frame whereby the operator, depending on the person, can adjust the stereoscope to see more easily.

In relation to the connection between the stereoscope and a base stand 6, the stereoscope is capable of being freely removed. From the frame of the stereoscope (1) a grip 5, having a hole portion, is mounted on a holder provided on base stand 6 by means of a bolt (9) through the hole portion. (see FIG. 2)

In connection with the microscope, as with the stereoscope, cylindrical body 20 is provided with a grip 11 having a hole portion. The grip is mounted on the base stand 6 by means of a bolt 9 through the hole portion (see FIG. 3).

As shown in the drawing, provision of a pinion and rack mechanism enables adjustment of the height of the stereoscope or of the microscope.

According to the structure of the invention, as mentioned above, it provides together with a wide visual range range and a good stereoscopic view which are characteristic of a stereoscope the excellent advantages, with the combination of an objective lens and eye pieces, of high magnification, elimination of the defect causing fatigueness of the eyes, and enables use for long periods of time.

Also in the case when the stereoscope is detached at the base stand 6, the stereoscope body can be used only as a binocular magnifying lens.

When using the stereoscope in a dissection or the like, a dissected body rested on a sample holder provided on the base stand is observed with the stereoscope and when further observation of the dissected body with a microscope is done, it is convenient since the stereoscope body can be replaced by a microscope body for microscopic use and it is not necessary to transfer the dissected body to another sample holder.

What is claimed is:

1. A stereoscope comprising:
   a. a frame;

b. an objective lens having an optical axis, said objective lens being mounted in said frame;
c. a pair of eye pieces each having an optical axis which intersect said objective lens at points laterally spaced from its optical axis;
d. a pair of carriers, one for each of said eye pieces; and
e. tongue and grooves included on the said frame and carriers for mounting said carriers on said frame and for moving said carriers relative to said frame to adjust the distance between the optical axis of said eye pieces and their points of insection with said objective lens relative to its optical axis.

2. The stereoscope of claim 1, wherein light passing on the optical axis of objective lens is communicated to neither one of said eye pieces.

3. The stereoscope of claim 1, further including a stand having a sample holder, and means for temporarily mounting said frame to said stand.